(12) United States Patent
Eriksen et al.

(10) Patent No.: US 8,827,220 B2
(45) Date of Patent: Sep. 9, 2014

(54) ASSEMBLING ARRANGEMENT FOR SECURING A TUBULAR FURNITURE LEG TO THE TOP PLATE OF A PIECE OF FURNITURE

(75) Inventors: Steen Mandsfelt Eriksen, Graested (DK); Gunilla Mandsfelt Eriksen, Graested (DK)

(73) Assignee: Midform A/S, Middelfart (DK)

( * ) Notice: Subject to any disclaimer, the term of this patent is extended or adjusted under 35 U.S.C. 154(b) by 897 days.

(21) Appl. No.: 12/674,663

(22) PCT Filed: Jul. 18, 2008

(86) PCT No.: PCT/IB2008/052902
§ 371 (c)(1),
(2), (4) Date: Feb. 22, 2010

(87) PCT Pub. No.: WO2009/027885
PCT Pub. Date: Mar. 5, 2009

(65) Prior Publication Data
US 2011/0225802 A1      Sep. 22, 2011

(30) Foreign Application Priority Data

Aug. 24, 2007 (DK) .................................. 2007 01216

(51) Int. Cl.
*B23P 11/00* (2006.01)

(52) U.S. Cl.
USPC ............... 248/188; 29/525.01; 29/525.11; 108/158; 248/188.5; 248/188.4; 248/163.1

(58) Field of Classification Search
USPC .......... 29/525.02, 525.01, 525.11; 248/188.5, 248/165, 405, 157, 161, 188, 188.1, 188.4, 248/188.8, 163.1; 297/440.24, 344.18, 135, 297/170–172, 461; 108/153.1, 156, 157.1, 108/158, 158.11, 159
See application file for complete search history.

(56) References Cited

U.S. PATENT DOCUMENTS 561,212 A * 6/1896 Epstein .......................... 108/34
3,117,392 A * 1/1964 Junkunc ..................... 248/188.3
(Continued)

FOREIGN PATENT DOCUMENTS

DE         91 05 025         7/1991
DE         197 30 921         1/1999
(Continued)

OTHER PUBLICATIONS

Insulation definition; Merriam-Webster online dictionary; http://www.merriam-webster.com/dictionary/insulation; p. 1.*

(Continued)

*Primary Examiner* — Jermie Cozart
*Assistant Examiner* — Bayan Salone
(74) *Attorney, Agent, or Firm* — Winstron & Strawn LLP (57) ABSTRACT

An assembling arrangement serves for securing a tubular furniture leg to the top plate of a piece of furniture. The assembling arrangement comprises a through opening formed in the top plate, a top mounting, which spans the through opening on the top side of the top plate, a bottom mounting, which spans the through opening on the bottom side of the top plate and is attached to the leg, a first bore formed through the top mounting and a second bore formed through the bottom mounting in line with the first bore, a screw having a shaft extending downwards in the leg via the first bore, the through opening and the second bore, a nut for the screw shaft placed in the leg, and an anchoring mechanism for firmly anchoring the nut in the leg in the secured state of the leg. The assembling arrangement is inexpensive and strong and can advantageously be used for mounting legs upon cantilever tables and chairs.

18 Claims, 7 Drawing Sheets

(56) References Cited

U.S. PATENT DOCUMENTS

| | | | | |
|---|---|---|---|---|
| 3,185,423 A * | 5/1965 | Jones, III | | 248/188.3 |
| 3,227,113 A * | 1/1966 | Kupski | | 108/148 |
| 3,538,906 A * | 11/1970 | Halen et al. | | 126/25 R |
| 3,778,957 A * | 12/1973 | Appleberry | | 52/22 |
| 3,855,946 A * | 12/1974 | Bales | | 108/147.21 |
| 3,869,218 A * | 3/1975 | Stoeber et al. | | 403/241 |
| 3,908,565 A * | 9/1975 | Burnett | | 108/147 |
| 4,327,461 A * | 5/1982 | Wisniewski | | 16/42 R |
| 4,607,577 A * | 8/1986 | Leonardo | | 108/146 |
| 4,807,838 A * | 2/1989 | Anderson | | 248/188.1 |
| 5,076,521 A * | 12/1991 | Neubauer | | 248/188 |
| 5,222,705 A * | 6/1993 | Gibran et al. | | 248/170 |
| 5,243,921 A * | 9/1993 | Kruse et al. | | 108/147 |
| 5,613,342 A * | 3/1997 | Nelson | | 52/782.2 |
| 5,871,191 A * | 2/1999 | Cohn | | 248/242 |
| 5,881,980 A * | 3/1999 | Knudson | | 248/188.8 |
| 5,944,272 A * | 8/1999 | Comotto et al. | | 242/131 |
| 6,003,962 A * | 12/1999 | Song | | 312/195 |
| 6,148,741 A * | 11/2000 | Motta | | 108/96 |
| 6,289,825 B1 * | 9/2001 | Long | | 108/147 |
| 6,327,985 B1 * | 12/2001 | Frenkler et al. | | 108/147.19 |
| 6,484,648 B1 * | 11/2002 | Long | | 108/147 |
| 6,629,506 B2 * | 10/2003 | Park | | 108/156 |
| 6,705,239 B2 * | 3/2004 | Doyle | | 108/147 |
| 6,899,396 B2 * | 5/2005 | Bales | | 297/446.2 |
| 7,658,359 B2 * | 2/2010 | Jones et al. | | 248/406.1 |
| 8,079,314 B2 * | 12/2011 | MacLean et al. | | 108/158.11 |
| 8,079,315 B2 * | 12/2011 | Berent et al. | | 108/158.12 |
| 8,088,984 B2 * | 1/2012 | Meyer et al. | | 84/421 |
| 8,091,489 B2 * | 1/2012 | Karrasch et al. | | 108/153.1 |
| 2002/0189505 A1 * | 12/2002 | Markofer | | 108/50.01 |
| 2005/0002732 A1 | 1/2005 | Choy | | 403/297 |
| 2006/0278139 A1 | 12/2006 | Korb | | 108/155 |

FOREIGN PATENT DOCUMENTS

| | | | | |
|---|---|---|---|---|
| DE | 19730921 A1 * | 1/1999 | | F16B 5/02 |
| WO | WO 03/025404 | 3/2003 | | |
| WO | WO 2007/084093 | 7/2007 | | |

OTHER PUBLICATIONS

International Search Report, PCT/IB2008/052902, mailed Mar. 17, 2009.

* cited by examiner

ASSEMBLING ARRANGEMENT FOR SECURING A TUBULAR FURNITURE LEG TO THE TOP PLATE OF A PIECE OF FURNITURE

This application is a 371 filing of International Patent Application PCT/IB2008/052902 filed Jul. 18, 2008.

BACKGROUND

The present invention relates to an assembling arrangement for securing a tubular furniture leg to the top plate of a piece of furniture.

The term top plate is used herein for stating that the plate is mounted upon the top of the leg. The top plate thus is a tabletop if the piece of furniture is a table and a seat if the piece of furniture is a chair.

Pieces of furniture usually are equipped with more legs for thereby imparting them with a stable and solid support on the base upon which they are standing.

The legs are, in one kind of known furniture systems attached to a frame, which again is attached to the top plate. The strength of the frame thereby superimposes the strength of the top plate whereby the respective piece of furniture achieves a construction, which is too heavy and too costly for many applications.

Also, this furniture system is very little flexible causing that needed modifications of furniture in e.g. schools for being able to comply with varying requirements often are impossible or at least very difficulty and costly to carry out.

As example of such furniture can be mentioned the table according to the US publication 2006278139 and the chair according to the WO publication 2007084093. Those furniture are not height-adjustable in that extent which is required in e.g. schools where the pupils normally have varying heights and are growing with their age too.

The legs and the top plate are, in another kind of furniture system, assembled without any intervening frame whereby that advantage is obtained that the construction of furniture of that system becomes more flexible and less expensive.

As example of such furniture can be mentioned the table according to the patent GB patent 896,578 disclosing that each leg is equipped with an individual mounting fastened to the underside of the top plate by means of a number of screws. Also that known table is not sufficiently height-adjustable.

The construction of furniture of this other kind of furniture system is moreover rather weak and unstable and especially when the top plate is thin so only short screws can be used.

Said weakness causes that the top plate of a piece of furniture of that kind cannot be cantilevered mounted upon the associated leg since the connection between the tabletop and the leg in this case is loaded by a usually large moment which the screw connections between the top plate and the leg hardly are able to stand.

SUMMARY OF THE INVENTION

The above-mentioned disadvantages of the prior art assembling arrangement for securing a furniture leg to the top plate of a piece of furniture is according to the invention remedied by, in a first aspect of the invention providing an assembling arrangement of the kind mentioned in the opening paragraph which has a simple and non-expensive structure, in a second aspect of the invention providing an assembling arrangement of the kind mentioned in the opening paragraph where a piece of furniture in mounted state has a stronger and more stable connection between the leg and the top plate than hitherto known, in a third aspect of the invention providing an assembling arrangement of the kind mentioned in the opening paragraph where a piece of furniture in mounted state also has a stronger and more stable connection between the leg and the top plate than hitherto known when the top plate is particular thin, in a fourth aspect of the invention providing an assembling arrangement of the kind mentioned in the opening paragraph where a piece of furniture in mounted state has a stronger and more stable connection between the leg and the top plate than hitherto known when the top plate is cantilevered mounted upon the leg, in a fifth aspect of the invention providing an assembling arrangement of the kind mentioned in the opening paragraph consisting of components adapted to be easily and quickly assembled to a piece of furniture and separated again if required, in a sixth aspect of the invention providing an assembling arrangement of the kind mentioned in the opening paragraph in which the components are adapted to be assembled to furniture of different sizes, in a seventh aspect of the invention providing an assembling arrangement of the kind mentioned in the opening paragraph in which a piece of furniture easily, quickly and securely can be height adjusted, in an eight aspect of the invention providing an assembling arrangement of the kind mentioned in the opening paragraph in which the furniture are tables, in an ninth aspect of the invention providing an assembling arrangement of the kind mentioned in the opening paragraph in which the furniture are chairs.

The novel and unique of the invention whereby these features are achieved consist in the fact that a through opening is formed in the top plate, a top mounting spans the through opening on the top side of the top plate, a bottom mounting spans the through opening on the bottom side of the top plate and is attached to the leg, a first bore is formed through the top mounting and a second bore is formed through the bottom mounting in line with the first bore, a screw having a shaft is extending downwards in the leg via the first bore, the through opening and the second bore, a nut for the screw shaft is placed in the leg, and an anchor means is serving for firmly anchoring the nut in the leg in the secured state of the leg.

The top plate thereby tightly can be sandwiched between the two mountings by simply tightening the screw so that a very strong and secure connection between the leg and the top plate of a piece of furniture in this way advantageously is obtained.

The superior strength of the connection between the leg and the top plate is, according to the invention, obtained by transmitting forces acting between the leg and the top plate only as compressive forces between co-operating surfaces of the top plate and the associated mountings, respectively and not as conventionally as shearing forces and tensile forces between the top plate and screws.

The top plate therefore can be made of a thin material whereby a light and non-expensive piece of furniture is achieved.

The connection between the leg and the top plate can, according to the invention, furthermore be strong enough to allow the top plate to be cantilevered mounted on top of the leg, and even if the top plate is very thin.

The connection between the leg and the top plate will in this case be acted on by a relatively large moment produced by a load on the top plate. A reaction moment then is formed by means of the compressive forces acting between the co-operating surfaces of the top plate and the associated mountings.

A relatively large reaction moment can be provided since the allowable compressive pressure per surface unit between mountings of e.g. iron and top plates of e.g. pressure laminate notoriously can be very large.

The compressive pressure, which actually is acting upon each surface unit, is depending also on the lever arm between the acting surface areas of the reaction moment, which lever arm again is depending on the extension of the mountings.

The leg can, according to the invention, moreover be formed with an elongated support foot for forming a reaction moment turning in the opposite direction of the moment produced by the load on the top plate.

A piece of furniture, for instance a table or a chair, also obtains a simple and non-expensive construction since the assembling arrangement consists of a few simple components and the leg is mounted to the top plate without using e.g. costly frames.

The components can, according to the invention, moreover be adapted to easily and quickly being assembled to a piece of furniture and to be separated again if required.

The components therefore easily can be reused to furniture of different sized whereby advantageously is achieved that the furniture of for instance a school can be rebuilt if required.

For being able to easily and quickly adjusting the height of a piece of furniture can the leg of the assembling arrangement, according to the invention, advantageously be formed as a telescope in form of a row of telescopic tubes, whereby the anchor means can comprise pairs of anchors with opposite co-operating faces forming an angle with the axis of the leg, and a pair of anchors can be placed in at least the lowest of the telescopic tubes in the row.

The opposite co-operating faces of each pair of anchors will by tightening the screw be pressed against each other by means of the tensile force of the tightened screw joint whereby the two anchors of each pair of anchors will slide upon each other into opposite cross travel direction with the result that they both are tightly jammed against the inner site of the respective telescopic tube owing to the fact that their opposite co-operating faces both are forming an angle with the axis of the leg. The nut now is firmly anchored in the pair of anchors.

When the row of telescopic tubes consists of more than two telescopic tubes and a pair of anchors is placed in each of two successive telescopic tubes can a distance piece according to the invention be extending between said two pair of anchors.

When the leg consists of only two telescopic tubes can one of the pair of anchors according to the invention be formed at the free end of the uppermost one of the telescopic tubes. This construction is particular simple.

The connection between the pair of anchors and the telescope tubes is disconnected by simply loosening the screw whereby the connection between the telescope tubes simultaneously is disconnected. The telescopic tubes now are allowed to axially being displaced in relation to each other for thereby changing the height of the respective piece of furniture, after which the screw is tightened again.

The telescope tubes of the telescope can according to the invention furthermore be formed with co-operating grooves and tongues allowing the tubes to slide but not to turn in relation to each other for thereby securing the correct direction of the elongated support foot in relation to the piece of furniture.

BRIEF DESCRIPTION OF THE DRAWINGS

The invention will be explained in greater details below where further advantageous properties and example embodiments are described with reference to the drawings, in which.

In the following description is the assembling arrangement in one embodiment used for securing the legs of a cantilever table to the tabletop of the table and in another embodiment used for securing the legs of a cantilever chair to the seat of the table.

Figure 1:
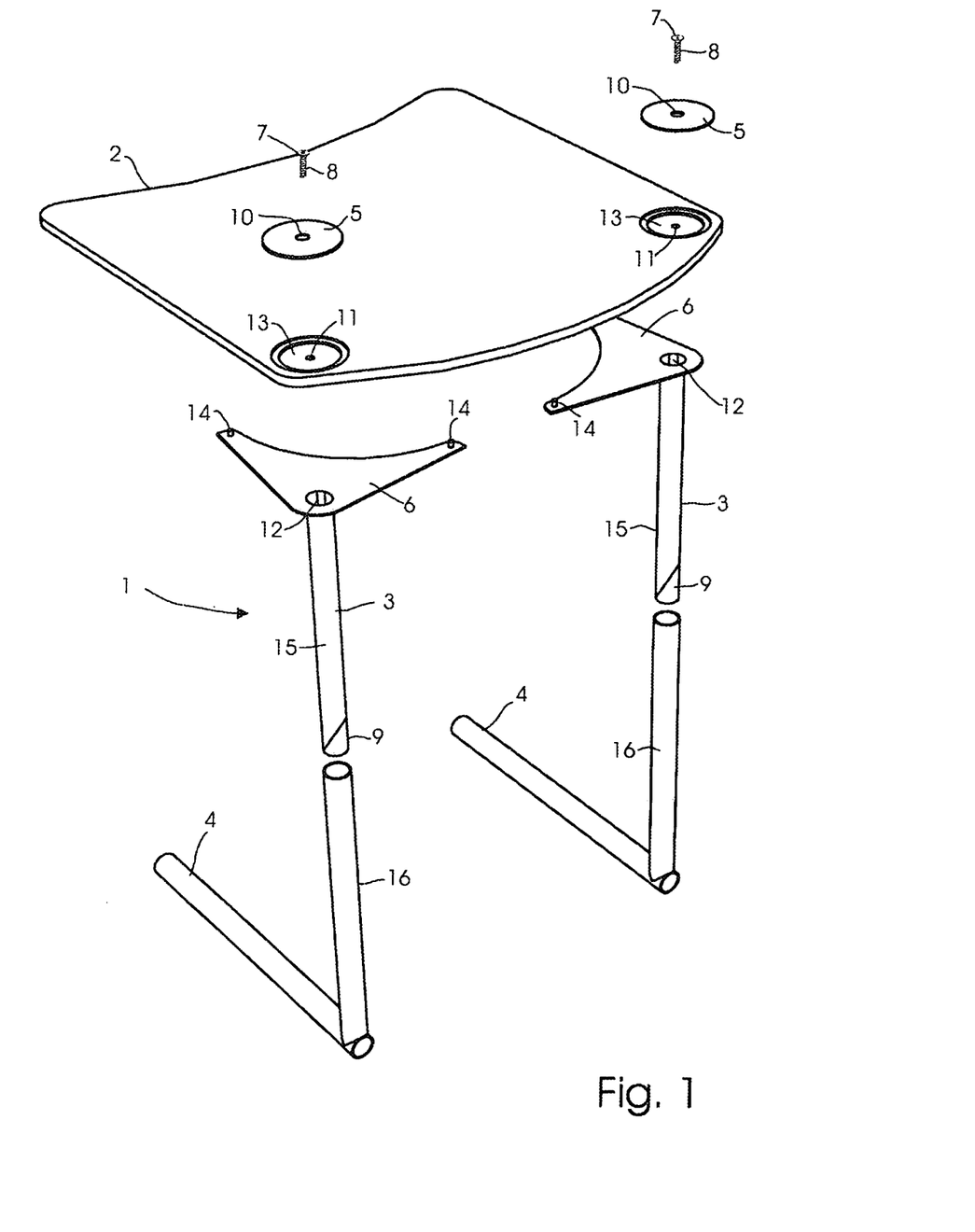
FIG. 1 is an exploded view of a cantilever table according to the invention.
Figure 2:
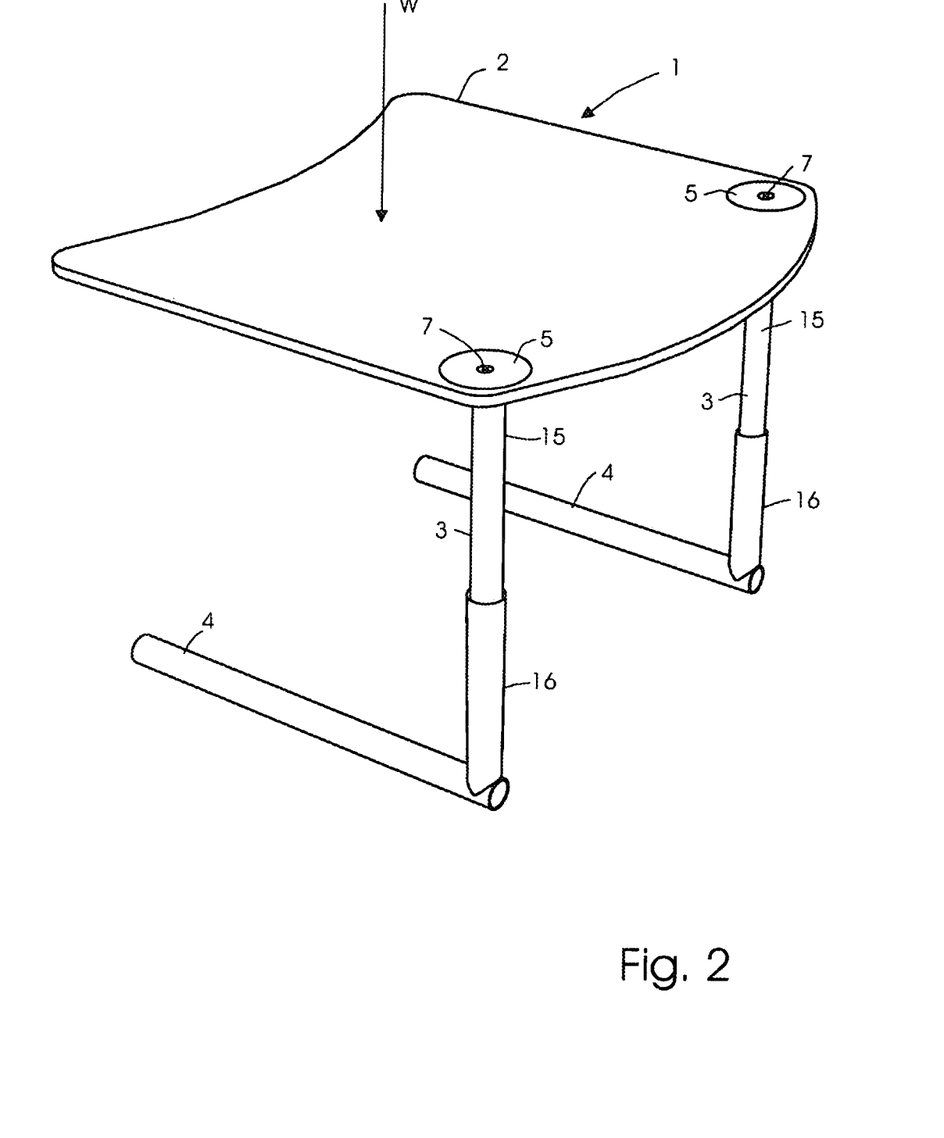
FIG. 2 shows the same table in assembled state.

FIGS. 1 and 2 show such cantilever table 1 comprising a tabletop 2 cantilevered mounted upon two legs 3 which each has an elongated support foot 4 for preventing the table to tilt when being loaded by a weight which in FIG. 2 is illustrated by means of the arrow W.

The fact that the legs are placed at the rear of the tabletop is imparting the user of the table completely freedom of movement without being troubled by legs placed at the front of the tabletop as in conventional tables with four legs.

Said advantage of cantilever tables is especially large when the tables are relatively small as e.g. in schools where the pupils are sitting at each their table.

The connections between the legs of the cantilever table and the tabletop are however stressed by a moment produced by the actual weight on the tabletop since the tabletop is cantilevered mounted upon the legs.

The connections between the legs and the tabletop need to be strong enough to stand the moment from the weight, which could be rather high, for instance at least as the weight of a grown man. The size of the moment therefore would be high.

A connection where the legs are fastened to the tabletop by means of screws fastened to the underside of the tabletop would hardly be strong enough to stand such high moment.

A connection strong enough could however be established when connecting the tabletop to a frame which again is connected to the legs. This construction is however heavy and costly.

DETAILED DESCRIPTION OF THE INVENTION

For obtaining the required strength of the connection between each leg and the tabletop is the stiffness of the tabletop of the cantilever table according to the invention instead being utilized.

This utilizing takes place by tightly sandwiching the tabletop 2 between a top mounting 5 and a bottom mounting 6 by means of a screw 7 having a shaft 8 extending downwards to a nut 23 (FIG. 5) in the respective leg 3 via a first bore 10 in the top mounting 5, a through opening 11 in the tabletop 2 and a second bore 12 in the bottom mounting 6 in line with the first bore 10.

Figure 5:
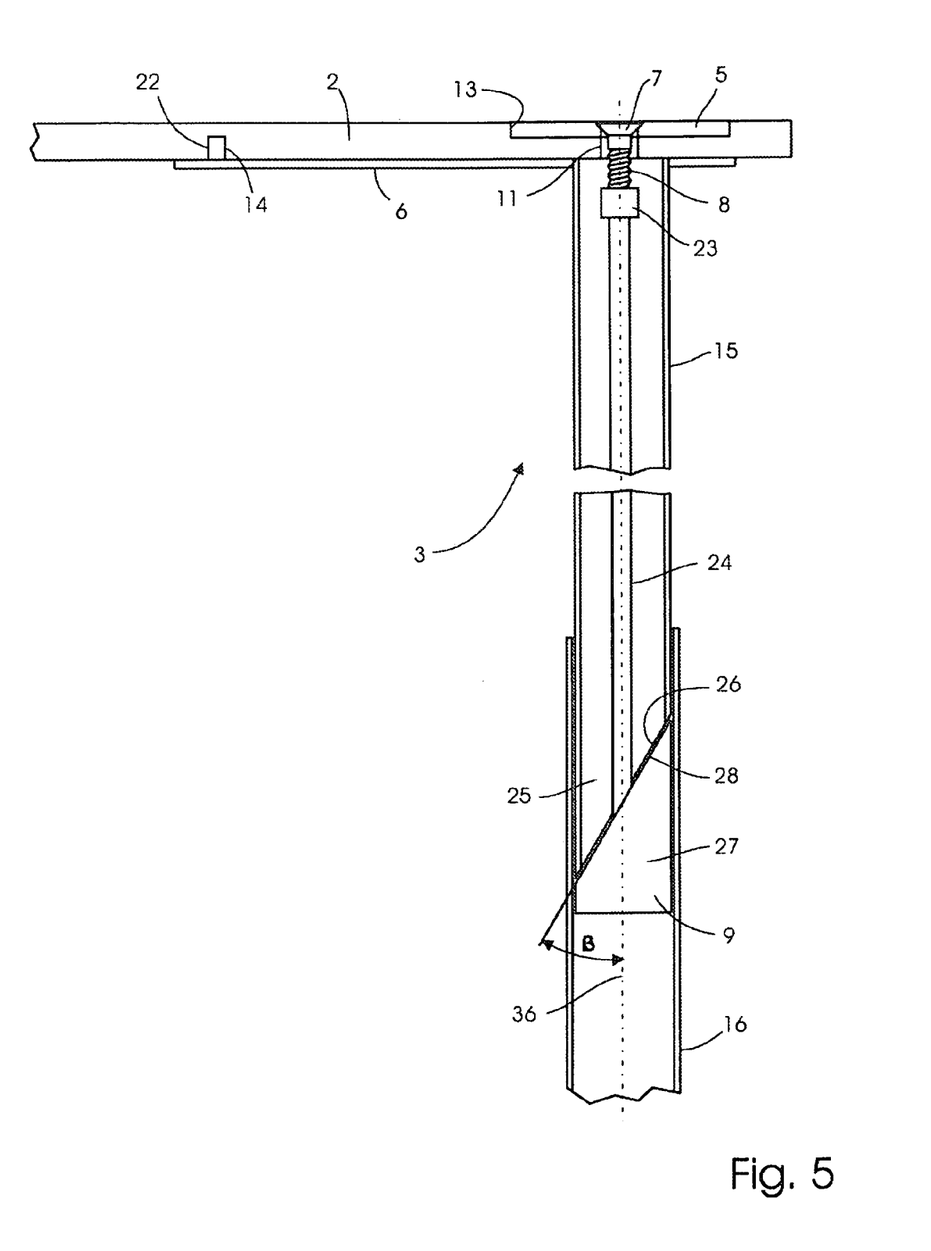
FIG. 5 is a fragmentarily lateral view of one embodiment of the assembling arrangement according to the invention, seen in section in a larger scale.

An anchor means 9 is moreover serving for firmly anchoring the nut in the leg in the secured state of this.

The top mounting 5 is in the shown embodiment formed as a disc placed in a recess 13 in the tabletop 2, while the bottom mounting 6 is attached to the leg and in the main is formed as a triangle 6.

The second bore 12 in the triangle 6 is formed in one of the corners 14 of the triangle. In each of the other corners of the triangle is attached a dowel 14 fitting into a blind hole 22 (FIGS. 5 and 6) formed in the tabletop for securing the correct orientation of the bottom mounting 6 and thereby of the foot in relation to the tabletop.

Each leg is in the shown embodiment formed as a telescope consisting in this case of an upper telescope tube 15 and a lower telescope tube 16 thereby making it easy to adjust the height of the legs as normally required in e.g. schools where the pupils can have varying heights and are growing also with their age.

Figure 3:
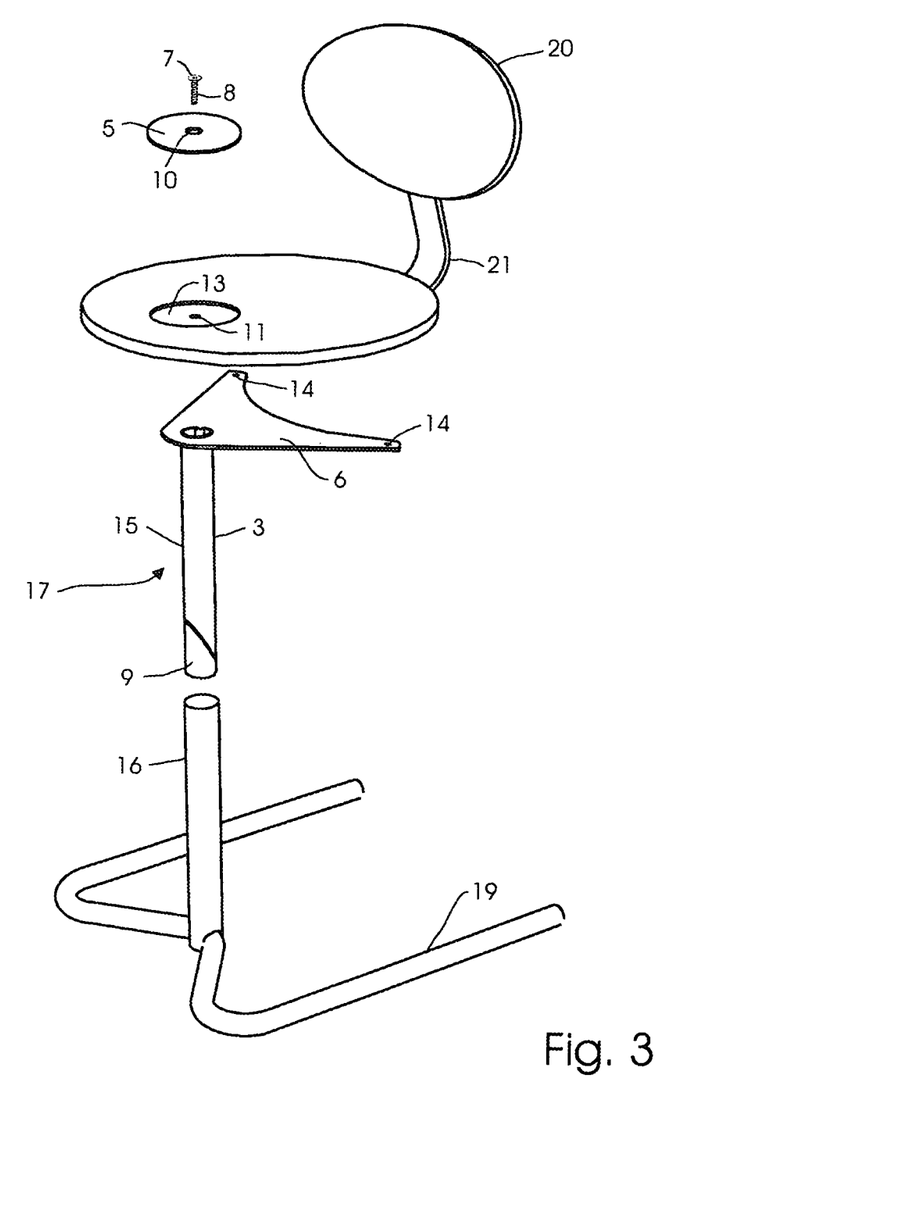
FIG. 3 is an exploded view of a cantilever chair according to the invention.
Figure 4:
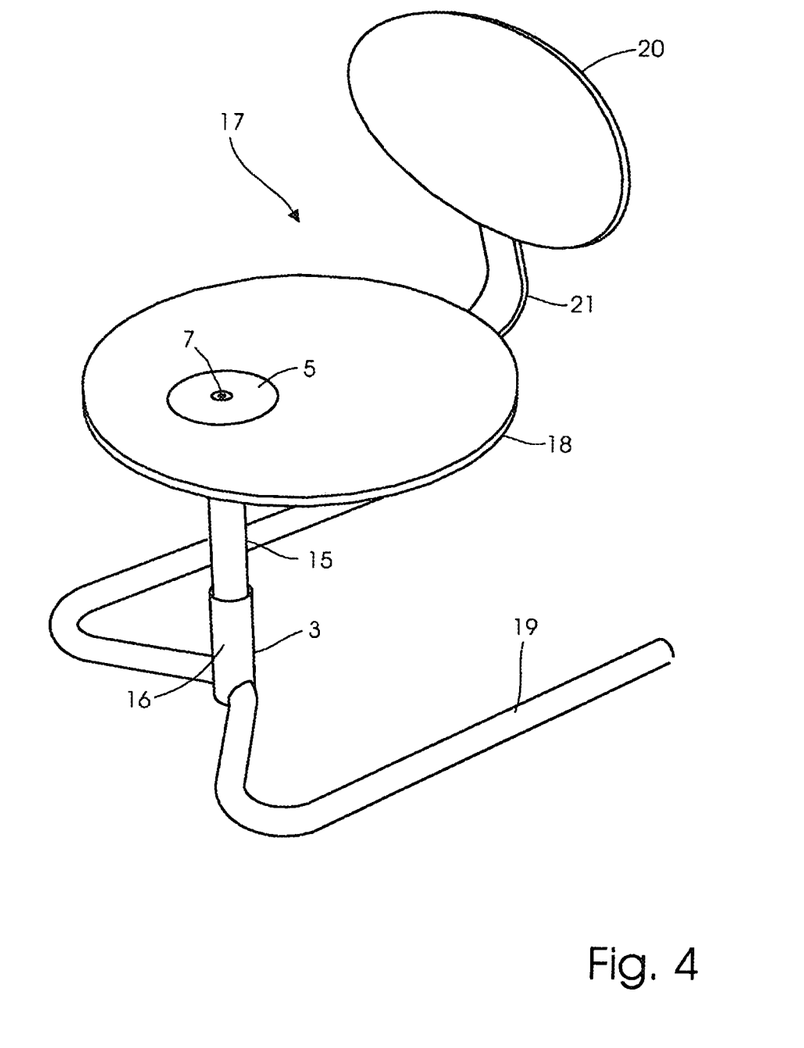
FIG. 4 shows the same chair in assembled state.

FIGS. 3 and 4 show a cantilever chair 17 with a construction, which in the main corresponds with the cantilever table shown in FIGS. 1 and 2 and which is functioning also in the same way. Same parts therefore are denoted with same reference numerals.

The cantilever chair 17 is in this case equipped with one leg 3 only. This leg is at the top connected to the seat 18 of the chair 17 and at the bottom to a bifurcated foot 19. A back support 20 is connected to the seat by means of an arched bar 21.

FIG. 5 shows in a larger scale a fragmentarily section of the table shown in FIGS. 1 and 2.

A rod 24 is via the leg 3 extending downwards from the nut 23 to the anchoring means 9, which is placed in the lower telescope tube 16.

The anchoring means 9 comprises an upper anchor 25 with a lower face 26 and a lower anchor 27 with an upper face 28. The two faces 26 and 28 are both forming an angle β with the axis 36 of the leg. The angle β may e.g. be 30 degrees.

The upper anchor 25 is, in this case, the beveled free end part of the upper telescope tube 15 while the lower anchor 27 is fastened to the rod.

In other embodiments may the upper anchor be formed like a mirror of the lower anchor and be attached to the upper telescope tube 15. This embodiment is not shown.

The opposite faces 26 and 28 of the inclined upper and lower anchors 25 and 27, respectively are by tightening the screw 7 pressed against each other whereby the two anchors 25 and 27 tightly are jammed against opposite areas of the inner side of the lower telescope tube 16 so that the nut 23 securely is anchored in the leg.

Figure 6:
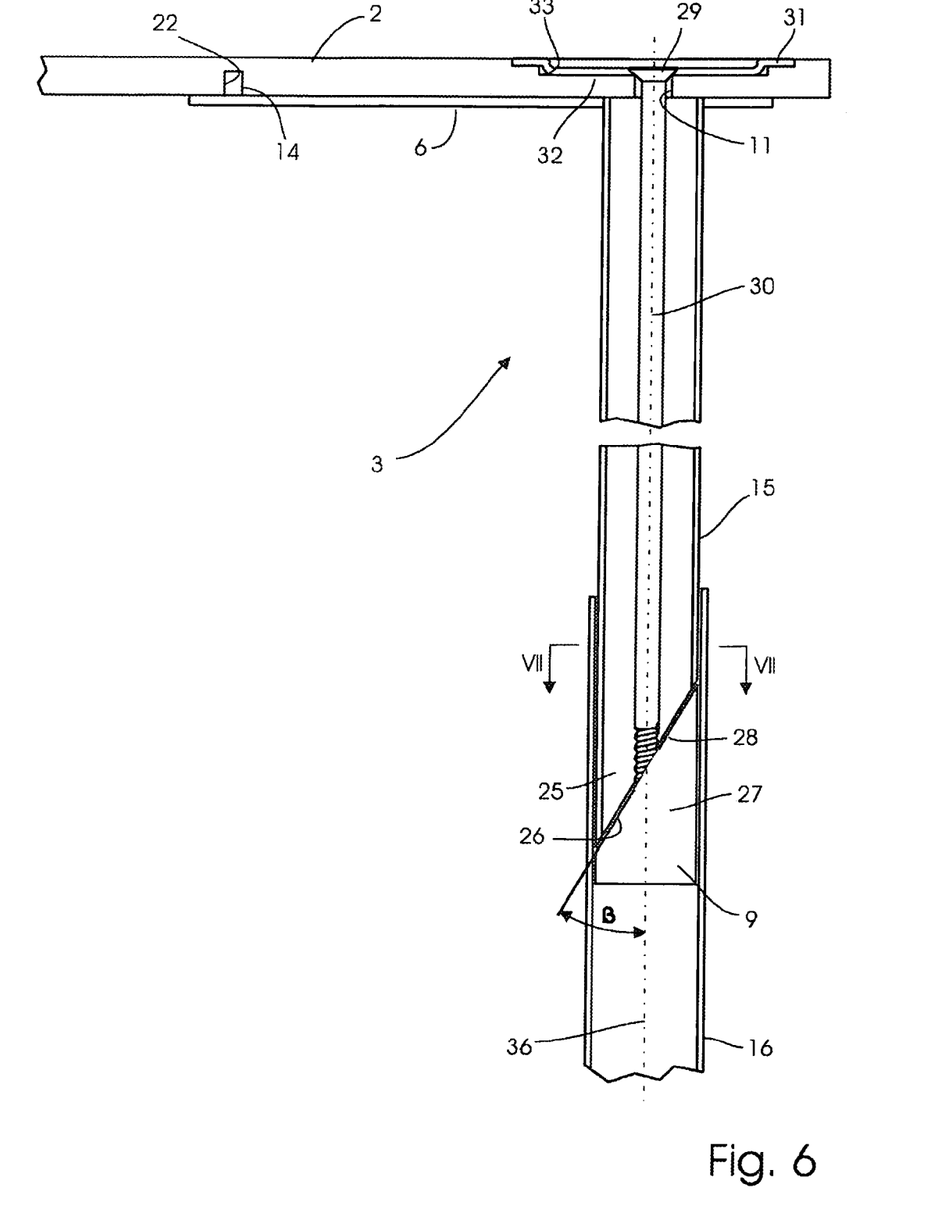
FIG. 6 is a fragmentarily lateral view of another embodiment of the assembling arrangement according to the invention, seen in section in a larger scale.

FIG. 6 shows a variant of the table shown in FIG. 5. Same parts are denoted with same reference numerals.

In this case is the lower anchor 27 serving also as a nut 27 for a screw 29 with a long shaft 30, and the top mounting is formed as a cup 31 with a projection 32 extending downwards into a recess 33 in the tabletop 2.

This cup can in e.g. a school advantageously be used for refreshments like e.g. a bottle of water or an apple, which the respective pupil is taking during the day.

Figure 7:
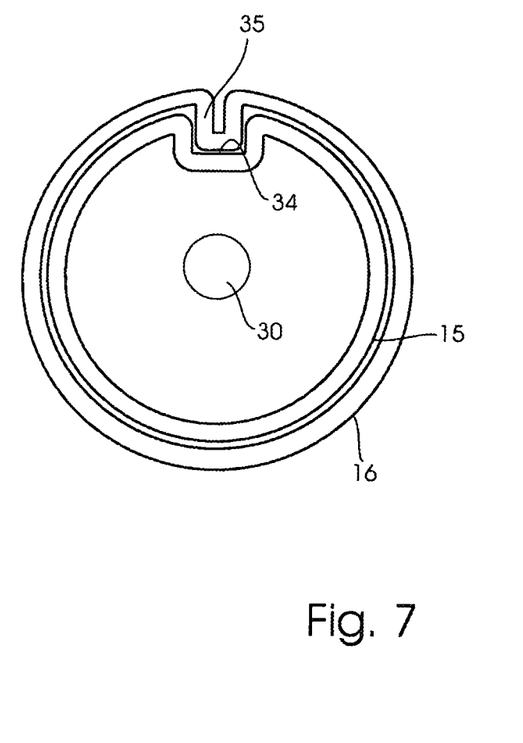
FIG. 7 shows in a still larger scale a cross section taken along the line Vll-Vll in FIG. 6.

FIG. 7 shows in a larger scale a cross-section of the leg 3 taken along the line Vll-Vll in FIG. 6. The upper telescope tube 15 is smaller than the lower telescope tube 16 so that the two telescope tubes are allowed to slide in relation to each other.

In the upper telescope tube 15 is formed a groove 34 and in the lower telescope tube 16 a tongue 35 fitting into the groove 34 formed in the upper telescope tube 15.

The co-operating grooves and tongues 34 and 35 are arranged for preventing turning of the telescopic tubes 15 and 16 in relating to each other for thereby securing that that the feet of the legs always are extending into the same predetermined direction in relation to the respective piece of furniture.

Above and in the drawing is the assembling arrangement described based on the assumption that the piece of furniture was a cantilever table or a cantilever chair.

The assembling arrangement can however within the scope of the invention with advantage be used also to other types of pieces of furniture equipped with legs.

Also the legs of the pieces of furniture each can comprise more than two telescopic tubes and the shapes of the top and bottom mountings can be different from the shapes of the top and bottom mountings shown in the drawings.

What is claimed is:

1. An assembling arrangement for securing a tubular furniture leg to a piece of furniture, wherein the piece of furniture is a cantilever table with a top plate forming a tabletop or a cantilever chair with a top plate forming a seat, respectively, with the top plate having a top side and a bottom side, which arrangement comprises:
    a through opening formed in the top plate;
    a top mounting which spans the through opening on the top side of the top plate;
    a bottom mounting which spans the through opening on the bottom side of the top plate and is attached to the leg;
    a first bore formed through the top mounting and a second bore formed through the bottom mounting in line with the first bore;
    a screw having a shaft extending downwards in the leg via the first bore, the through opening and the second bore;
    a nut for the screw shaft placed in the leg; and
    an anchor means serving for firmly anchoring the nut in the leg to secure the leg to the top plate,
    wherein the leg has a longitudinal axis and is formed as a telescope in form of a row of telescopic tubes; the anchor means comprises pairs of anchors with opposite co-operating faces forming an angle (β) with the axis of the leg with a pair of anchors placed in at least the lowest tube in the row; and
    wherein a pair of anchors is placed in each of two successive telescopic tubes and a distance piece extends between the pair of anchors.

2. The assembling arrangement according to claim 1, wherein the leg consists of two telescopic tubes and one of the pair of anchors is formed at a free end of the uppermost one of the telescopic tubes.

3. The assembling arrangement according to claim 2, wherein the telescopic tubes are formed with co-operating grooves and tongues arranged for preventing turning of the telescopic tubes in relation to each other.

4. The assembling arrangement according to claim 3, wherein the leg has a longitudinal axis and is formed as a telescope in a row of telescopic tubes; and the anchor means comprises pairs of anchors with opposite co-operating faces forming an angle (β) with the axis of the leg with a pair of anchors placed in at least the lowest tube in the row.

5. The assembling arrangement according to claim 1, wherein the top plate is cantilevered mounted upon the leg and the leg is formed with an elongated foot for supporting the leg against a base.

6. The assembling arrangement according to claim 1, wherein the top mounting is formed as a cup with a projection extending into a recess formed in the top plate.

7. The assembling arrangement according to claim 1, wherein the top mounting is formed as a disc placed in a recess formed in the top plate.

8. The assembling arrangement according to claim 1, wherein the bottom mounting is formed generally as a triangle with the second bore placed at a corner of the triangle.

9. The assembling arrangement according to claim 8, wherein a dowel fitting into a blind hole formed in the top plate is attached to the top plate at least close to one of the triangle corners of the triangular bottom mounting.

10. The assembling arrangement according to claim 1, wherein the top plate is made of chip board or a laminate.

11. The assembling arrangement according to claim 1, wherein the top plate has a thickness of between 5 and 50 mm.

12. The assembling arrangement according to claim 1, wherein the top plate has a thickness of between 10 and 40 mm.

13. The assembling arrangement according to claim 1, in the form of a cantilever table having one or more legs.

14. The assembling arrangement according to claim 1, in the form of a cantilever chair having one or more legs.

15. The assembling arrangement according to claim 1, wherein the bottom mounting has a smaller area than the top plate.

16. The assembling arrangement according to claim 1, wherein the top mounting spans the trough opening on the top side of the top plate and has a smaller area than the top plate.

17. An assembling arrangement connecting a tubular furniture leg to a piece of furniture, wherein the piece of furniture is a cantilever table with a top plate forming a tabletop or a cantilever chair with a top plate forming a seat, respectively, with the top plate having a top side and a bottom side, comprising:
the tubular furniture leg;
the top plate of the piece of furniture; and
the assembling arrangement comprising:
 a through opening formed in the top plate;
 a top mounting which spans the through opening on the top side of the top plate;
 a bottom mounting which spans the through opening on the bottom side of the top plate and is attached to the leg;
 a first bore formed through the top mounting and a second bore formed through the bottom mounting in line with the first bore;
 a screw having a shaft extending downwards in the leg via the first bore, the through opening and the second bore;
 a nut for the screw shaft placed in the leg; and
 an anchor means serving for firmly anchoring the nut in the leg to secure the leg to the top plate;
 wherein the leg has a longitudinal axis and is formed as a telescope in a row of telescopic tubes; the anchor means comprises pairs of anchors with opposite co-operating faces forming an angle ($\beta$) with the axis of the leg with a pair of anchors placed in at least the lowest tube in the row; and
 wherein a pair of anchors is placed in each of two successive telescopic tubes and a distance piece extends between the pair of anchors.

18. The combination according to claim 17, wherein the bottom mounting has a smaller area than the top plate and the top mounting spans the trough opening on the top side of the top plate and has a smaller area than the top plate.

* * * * *